(12) United States Patent
Hou et al.

(10) Patent No.: US 12,312,546 B2
(45) Date of Patent: May 27, 2025

(54) TERAHERTZ MATERIAL FOR EMISSION REDUCTION AND FUEL SAVING OF GASOLINE VEHICLE AND PREPARATION METHOD THEREFOR AND APPLICATION THEREOF

(71) Applicant: Henan Jingpin New Material Technology Co., Ltd., Zhengzhou (CN)

(72) Inventors: Wenhao Hou, Tianjin (CN); Yan Tong, Tianjin (CN)

( * ) Notice: Subject to any disclaimer, the term of this patent is extended or adjusted under 35 U.S.C. 154(b) by 830 days.

(21) Appl. No.: 17/620,682

(22) PCT Filed: Jun. 18, 2020

(86) PCT No.: PCT/CN2020/096829
§ 371 (c)(1),
(2) Date: Dec. 18, 2021

(87) PCT Pub. No.: WO2020/253781
PCT Pub. Date: Dec. 24, 2020

(65) Prior Publication Data
US 2022/0098502 A1 Mar. 31, 2022

(30) Foreign Application Priority Data
Jun. 18, 2019 (CN) .......................... 201910527706.6

(51) Int. Cl.
| | | |
|---|---|---|
| *C10L 1/12* | (2006.01) | |
| *B01J 19/08* | (2006.01) | |
| *C01B 33/18* | (2006.01) | |
| *C09K 5/10* | (2006.01) | |
| *C10L 10/02* | (2006.01) | |

(52) U.S. Cl.
CPC ........... *C10L 1/1233* (2013.01); *B01J 19/088* (2013.01); *C01B 33/181* (2013.01); *C10L 1/1216* (2013.01); *C10L 10/02* (2013.01); *C09K 5/10* (2013.01); *C10L 2200/0423* (2013.01); *C10L 2230/22* (2013.01); *C10L 2270/023* (2013.01)

(58) Field of Classification Search
None
See application file for complete search history.

(56) References Cited

U.S. PATENT DOCUMENTS 5,015,362 A * 5/1991 Chin ........................ B01J 37/04
423/239.1
5,809,775 A * 9/1998 Tarabulski .............. F01N 3/208
60/274

FOREIGN PATENT DOCUMENTS

CN 108425771 A * 8/2018

OTHER PUBLICATIONS

Chia et al. Microstructural characterization of white charcoal. Journal of Analytical and Applied Pyrolysis, 109, 215-221 (Year: 2014).*

* cited by examiner

*Primary Examiner* — Tanisha Diggs
(74) *Attorney, Agent, or Firm* — Novoclaims Patent Services LLC; Mei Lin Wong

(57) ABSTRACT

A terahertz material for emission reduction and fuel saving of gasoline vehicles and its preparation method and application, includes the following raw materials in parts by weight: 20~35 $SiO_x$, 3~15 $Al_2O_3$, 25~45 $SiO_2$, 15~25 $Fe_2O_3$, 20~40 ochre, 0.5~2 barium tungstate, 15~25 $CaCO_3$, wherein a preparation method includes: mixing the component raw materials according to the above ratio; after crushing, performing heating to 600~1,200° C. in an oxygen-free environment, maintaining the temperature for 3~8 hours, and then performing crushing for the second time; and performing enhancement processing with terahertz irradiation rays at 10 mW to 100 W for 5 seconds to 1 hour to obtain a terahertz material, wherein the terahertz material improves combustion efficiency by increasing the molecular activity of gasoline and air participating in combustion work and reducing molecular groups, and has the effects of emission reduction, energy saving and improving power.

5 Claims, 7 Drawing Sheets

TERAHERTZ MATERIAL FOR EMISSION REDUCTION AND FUEL SAVING OF GASOLINE VEHICLE AND PREPARATION METHOD THEREFOR AND APPLICATION THEREOF

CROSS REFERENCE OF RELATED APPLICATION

This application claims the benefit under 35 U.S.C. § 119 from International Application No. PCT/CN 2020/096829, which claims priorities to CN 201910527706.6, filed Jun. 18, 2019.

BACKGROUND OF THE PRESENT INVENTION

Field of Invention

The present invention relates to the technical field of terahertz, and more particularly to a terahertz material for emission reduction and fuel saving of a gasoline vehicle and its preparation method and application.

Description of Related Arts

The main components of automobile exhaust are hydrocarbons, nitrogen oxides, carbon monoxide, carbon dioxide, water, nitrogen and a small amount of oxygen. Among them, hydrocarbons, nitrogen oxides and carbon monoxide cause environmental pollution. Since the production conditions of hydrocarbons are opposite to those of nitrogen oxides, the combustion temperature will rise when the combustion efficiency of fuel is improved, and nitrogen oxides are easy to be produced at high temperature. Therefore, there is no reliable method that can simultaneously reduce the hydrocarbons and nitrogen oxides in the exhaust gas. The present invention is a material based on terahertz technology, and the products manufactured with the material can greatly reduce hydrocarbons and nitrogen oxides at the same time.

Moreover, since the maximum energy conversion rate of the current engine is 42%, and various scientific research institutions exhaust various means, it is difficult to continuously improve the thermal efficiency of the fuel. The present invention can improve the energy conversion rate of gasoline up to 47~50%.

SUMMARY OF THE PRESENT INVENTION

The present invention discloses a terahertz material for emission reduction and fuel saving of gasoline vehicles and its preparation method and application, aiming at the problems existing in the prior art.

In order to solve the above technical problems, the invention adopts the following technical solutions:

a terahertz material for emission reduction and fuel saving of a gasoline vehicle including the following raw materials in parts by weight: 20~35 $SiO_x$, 3~15 $Al_2O_3$, 25~45 $SiO_2$, 15~25 $Fe_2O_3$, 20~40 ochre, 0.5~2 barium tungstate, 15~25 $CaCO_3$, 5~10 Binchotan.

The preparation method of the terahertz material for emission reduction and fuel saving of a gasoline vehicle, comprising the following steps:

(1) mixing crude silicon, $SiO_2$ and Binchotan in a weight ratio of 1:(3~5):(5~10), and heating to 700~1500° C. in an oxygen-free environment for 1~8 hours to obtain a black crystal $SiO_x$;

(2) mixing the prepared $SiO_x$ with other raw materials in accordance with the stated proportions, crushing, the fineness reaches 200~500 mesh, and adding an appropriate amount of water (the standard is the raw material powder can be balled) and stirring to be turn into small balls through a circular rotary table, heating to 600~1200° C. in an oxygen free environment for 3~8 hours, and carrying out a secondary crushing;

(3) detecting its infrared emissivity, which is ≥0.92, and then crushing and powder processing, the fineness reaches is more than 10000 mesh, after enhancing by a terahertz irradiation line to obtain a terahertz materials for emission reduction and fuel saving of a gasoline vehicle.

the terahertz irradiation line includes a terahertz irradiation assembly, a transmission belt and a tunnel frame, the terahertz irradiation assembly is installed on the tunnel frame, the transmission belt is arranged through the tunnel frame, and the terahertz irradiation assembly is matched with the transmission belt, wherein the terahertz irradiation assembly comprises a terahertz wave electron generator and a cable, wherein the terahertz wave electron generator comprises a logic unit, a fundamental wave unit, an equalization circuit, an amplifier and a radiator, wherein the terahertz wave electron generator is connected with the radiator through a cable, and the radiator is attached on the inner wall of the tunnel frame.

The fundamental wave unit comprises a plurality of fundamental wave modules arranged in parallel, and the fundamental wave module comprises a driver, a BAW filter, a charge pump, an electro-photon transition module and a resonant cavity, wherein the logic unit controls the opening and closing of the charge pump through the driver, an external power supply supplies power to the electro-photon transition module through the BAW filter and the charge pump, and the electron beam generated in the electro-photon transition module is transmitted to the resonant cavity to generate a stable terahertz fundamental wave, wherein the logic unit controls each fundamental wave module to transmit terahertz fundamental wave, which is transmitted to the equalization circuit, wherein the equalization circuit modulates the received terahertz fundamental wave to obtain a composite terahertz wave, wherein the composite terahertz wave is transmitted to the amplifier, and the amplifier amplifies the received composite terahertz wave to obtain an amplified terahertz wave, wherein the amplified terahertz wave is transmitted to the radiator.

The electro-photon transition module comprises an electron gun, a pulse deflection coil, an electron beam, an anode and a transition cavity, wherein the transition cavity is communicated with the resonant cavity, the electron gun and the pulse deflection coil are installed within the transition cavity, and a frequency selective electric field is formed between the pulse deflection coil, wherein the anode is installed on the inner wall of the resonant cavity the electron gun is communicated with the external power supply through the charge pump and the BAW filter, wherein the electron gun emits an electron beam into the frequency selected electric field constructed by the pulse deflection coil 036, wherein the frequency selected electron beam enters the resonant cavity and is received by anode to generate the terahertz fundamental wave.

Further, the power of the terahertz irradiation line for enhancement treatment is 10 MW~100 W and the time of duration is 5 seconds~1 hour.

An application of the terahertz material for emission reduction and fuel saving of a gasoline vehicle, which is prepared by the preparation method: adding directly the terahertz material into to the coolant and/or making the terahertz material into an activation sheet and attaching it on a shell of an air filter.

The terahertz material is directly added into the coolant, and 2.5~6 g of the terahertz material is required per liter of gasoline according to the calculation of engine displacement, and quantitative products for different displacement ranges, for example, 10 g per bottle, suitable for engines below 2.0 L; two bottles are used for engines below 3.5 L; three bottles are used for engines below 5.0 L. The finished weight of each sheet is about 25~40 g, and the terahertz material consumption is about 30~55% of the finished weight. Corresponding to the engine, 2 sheets for engines below 2.0 L, 3 or 4 sheets for engines below 3.5 L, and 4~6 sheets for engines below 5.0 L. If there is not enough place to attach the sheet on the shell of the air filter, the sheet can be wrapped outside the air pipe and fixed by a tie.

An application of the terahertz material: being used as raw materials for making auto parts, for example, main water tank, air filter housing, engine intake pipe, fuel pipe, fuel tank bottom, ceramic piston, spark plug and cylinder liner.

Compared with the prior art, the terahertz material for emission reduction and fuel saving of a gasoline vehicle of the present invention has the following beneficial effects: 1) the terahertz material of the present invention includes $SiO_x$, $SiO_x$ has a special lattice structure, and the existence of $SiO_x$ makes the infrared emissivity of the terahertz material reach 92-96%, while the infrared emissivity of the terahertz material without $SiO_x$ is only about 80%; 2) The present invention improves the combustion efficiency by improving the molecular activity of gasoline and air participating in combustion work and reducing molecular groups, which solves the problem from the source; 3) At the same time, it has the effects of emission reduction, energy saving and power improvement. At present, the products in the market are the products having only a single effect, and there are often side effects affecting other functions while realizing one function; the principle of the present invention is also completely different from these products. 5) The present invention has the lowest cost in terms of any single effect; 6) The present invention can simultaneously reduce all harmful substances in the tail gas: hydrocarbons, nitrogen oxides and carbon monoxide, but more carbon dioxide and water will be produced due to more sufficient combustion of the fuel; 7) The derivative product with the present invention as the core raw material can meet the needs of stock transformation of all gasoline engines and vehicles and mass production of the whole machine factory; 8) According to the most optimistic calculation, all gasoline vehicles using this product can reduce urban PM2.5 by about 15~20%. 9) The present invention can improve the energy conversion rate of gasoline up to 47~50%.

Figure 1:
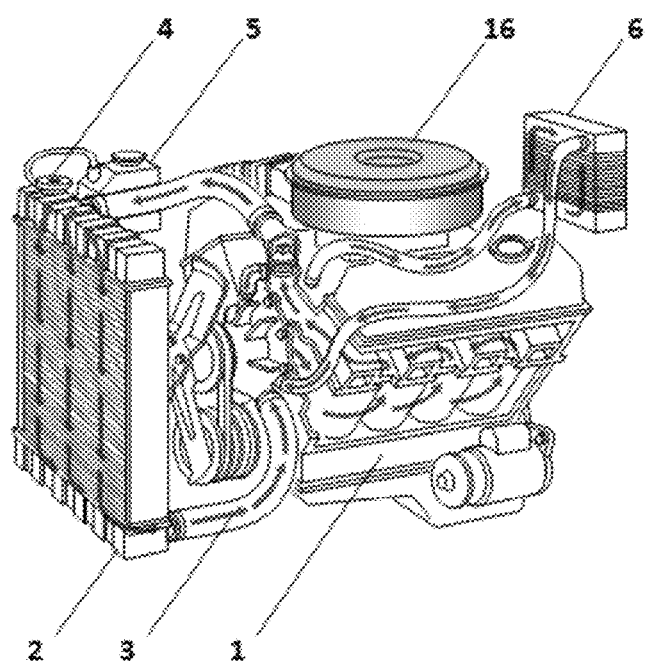
FIG. 1 shows a preferred application scheme of the terahertz material for emission reduction and fuel saving of a gasoline vehicle of the present invention.

The reference number 1 represents the internal combustion engine, the reference number 2 represents the main water tank, the reference number 3 represents the coolant/cooling cycle with terahertz material, the reference number 4 represents the main water tank port, the reference number 5 represents the auxiliary water tank, the reference number 6 represents the small water tank-cab warm air radiator, the reference number 7 represents the coolant with terahertz material, the reference number 8 represents the fuel (gasoline, diesel, liquefied gas, etc.), the reference number 9 represents the fuel tank, the reference number 10 represents the fuel pump, the reference number 11 represents the activation sheet containing terahertz material, the reference number 12 represents the air inlet, the reference number 13 represents the air (micro orderly arrangement), the reference number 14 represents the terahertz wave, the reference number 15 represents the activated air (micro chaotic disorder), the reference number 16 represents the outer shell of air filter, the reference number 17 represents the air filter element, the reference number 18 represents the filtered air (disordered), the reference number 19 represents the fuel nozzle, the reference number 20 represents the internal combustion engine-combustion chamber, the reference number 21 represents the fuller contact between activated air and fuel, the reference number 22 represents the piston/compression stroke start, the reference number 23 represents the exhaust port, the reference number 24 represents the coolant/main water tank filled with terahertz material, the reference number 25 represents the activation sheet/air cleaner housing containing terahertz material, the reference number 26 represents the activation sheet/engine intake pipe containing terahertz material, 27 represents the activation sheet/fuel pipe containing terahertz material 28 represents the activation sheet/fuel tank bottom containing terahertz material, 29 represents the special coolant containing terahertz material, the reference number 30 represents the main water tank containing terahertz material, the reference number 31 represents the air filter element containing terahertz material, the reference number 32 represents the air filter housing containing terahertz material, the reference number 33 represents the engine intake pipe containing terahertz material, the reference number 34 represents the fuel pipe containing terahertz material, the reference number 35 represents the fuel tank bottom shell containing terahertz material, the reference number 36 represents the ceramic piston containing terahertz material, spark plug, cylinder liner, the reference number 017 represents the terahertz wave electron generator, the reference number 018 represents the roasted terahertz material semi-finished product, the reference number 015 represents the cable, the reference number 012 represents the tunnel frame, the reference number 011 represents the transmission belt, the reference number 01 represents the logic unit, the reference number 02 represents the fundamental wave unit, the reference number 03 represents the equalization circuit, the reference number 04 represents the amplifier, the reference number 05 represents the radiator, the reference number 06 represents the driver, the reference number 07 represents the BAW filter, the reference number 08 represents the charge pump, the reference number 09 represents the electro-photon transition module, the reference number 010 represents the electron beam transmission to resonant cavity, the reference number 035 represents the electron gun, the reference number 036 represents the pulse deflection coil, the reference number 037 represents the electron beam, the reference number 038 represents the anode and the reference number 039 represents the transition cavity.

DETAILED DESCRIPTION OF THE PREFERRED EMBODIMENT

The present invention will be further described below in combination with the following specific embodiments. It should be understood that the following embodiments are only used to illustrate the present invention and not to limit the scope of the present invention. Those skilled in the art can make some non-essential improvements and adjustments according to the contents of the present invention.

Example 1

A terahertz material for emission reduction and fuel saving of a gasoline vehicle including the following raw materials in parts by weight: 25 $SiO_x$, 8 $Al_2O_3$, 30 $SiO_2$, 20 $Fe_2O_3$, 30 ochre, 1 barium tungstate, 20 $CaCO_3$.

The preparation method of the terahertz material for emission reduction and fuel saving of a gasoline vehicle, comprising the following steps:

(1) mixing crude silicon, $SiO_2$ and Binchotan in a weight ratio of 1:4:8, and heating to 1200° C. in an oxygen-free environment for 5 hours to obtain a black crystal $SiO_x$;

(2) mixing the prepared $SiO_x$ with other raw materials in accordance with the stated proportions, crushing, the fineness reaches 200~500 mesh, and adding an appropriate amount of water, stirring, turning it into small balls through a circular rotary table, heating to 800° C. in an oxygen free environment for 5 hours, and carrying out a secondary crushing;

(3) detecting its infrared emissivity, which is ≥0.92, and then crushing and powder processing, the fineness reaches is more than 10000 mesh, after being enhanced by a terahertz irradiation line (20 W power, the time of duration: 10 min) to obtain a terahertz materials for emission reduction and fuel saving of a gasoline vehicle.

Figure 5:
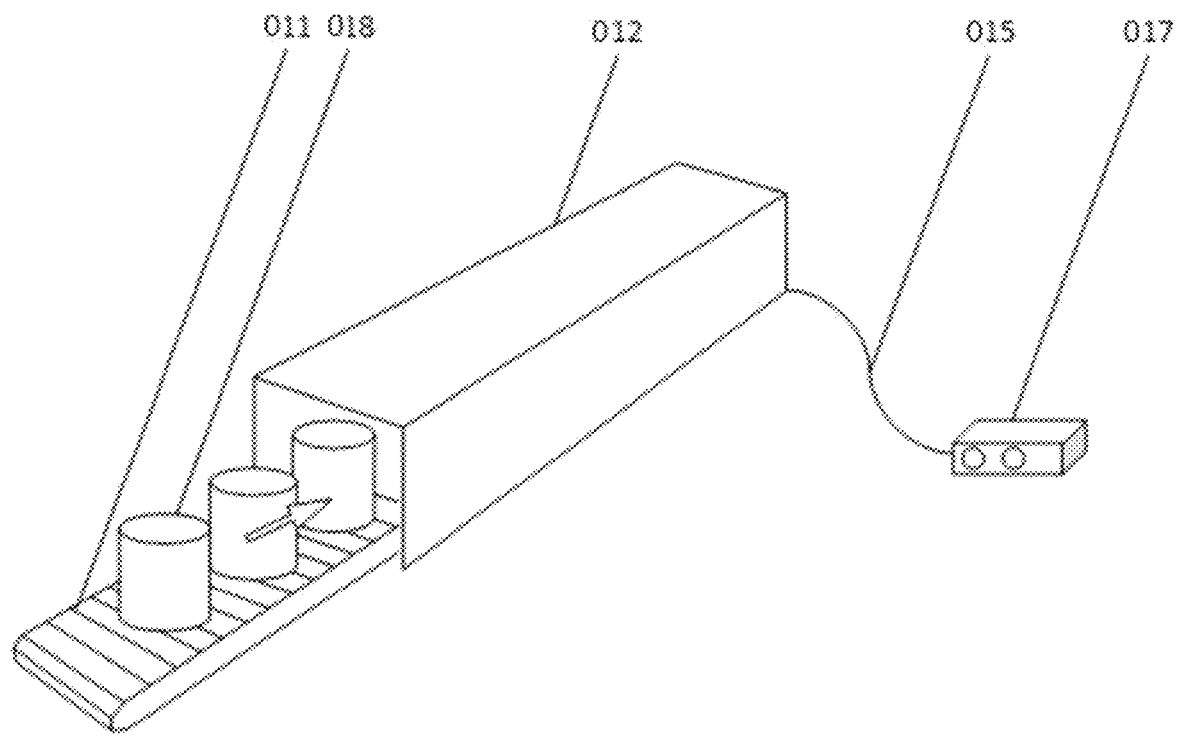
FIG. 5 shows a structure diagram of the terahertz irradiation source of the present invention.

As shown in FIG. 5, the terahertz irradiation source comprises a terahertz irradiation assembly, a transmission belt 011 and a tunnel frame 012, wherein the terahertz irradiation assembly is installed on the tunnel frame 012, the transmission belt 011 is arranged through the tunnel frame 012, and the terahertz irradiation assembly is matched with the transmission belt 011, wherein the terahertz irradiation assembly comprises a terahertz wave electron generator and a cable, wherein the terahertz wave electron generator comprises a logic unit 01, a fundamental wave unit 02, an equalization circuit 03, an amplifier 04 and a radiator 05, wherein the terahertz wave electron generator is connected with the radiator 05 through a cable, and the radiator 05 is attached on the inner wall of the tunnel frame 012.

Figure 6:
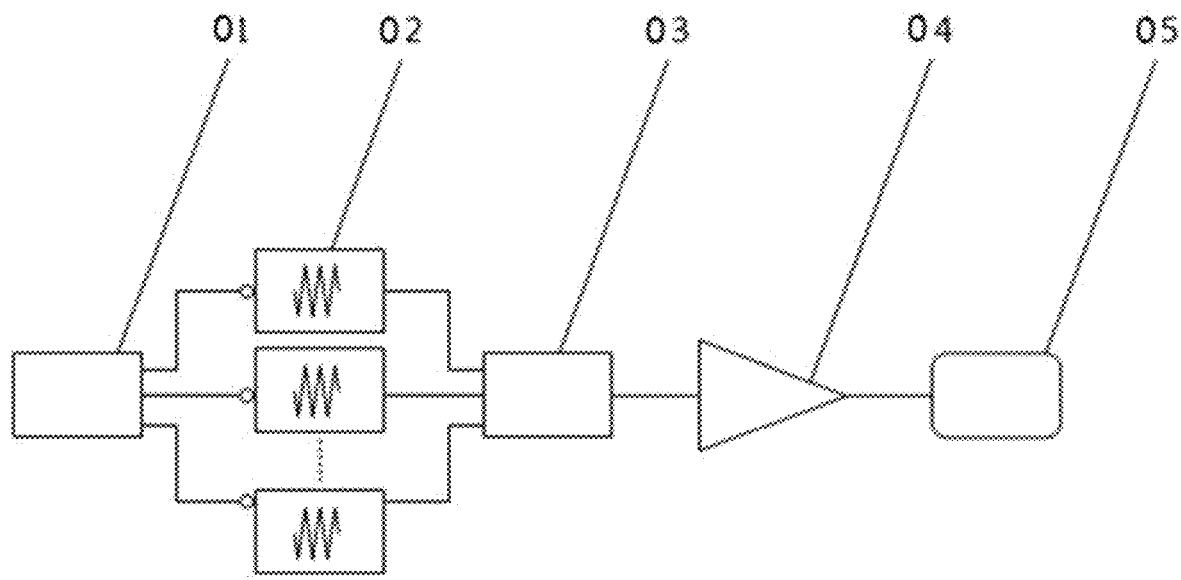
FIG. 6 is a schematic diagram of the terahertz wave electron generator shown in FIG. 5.
Figure 7:
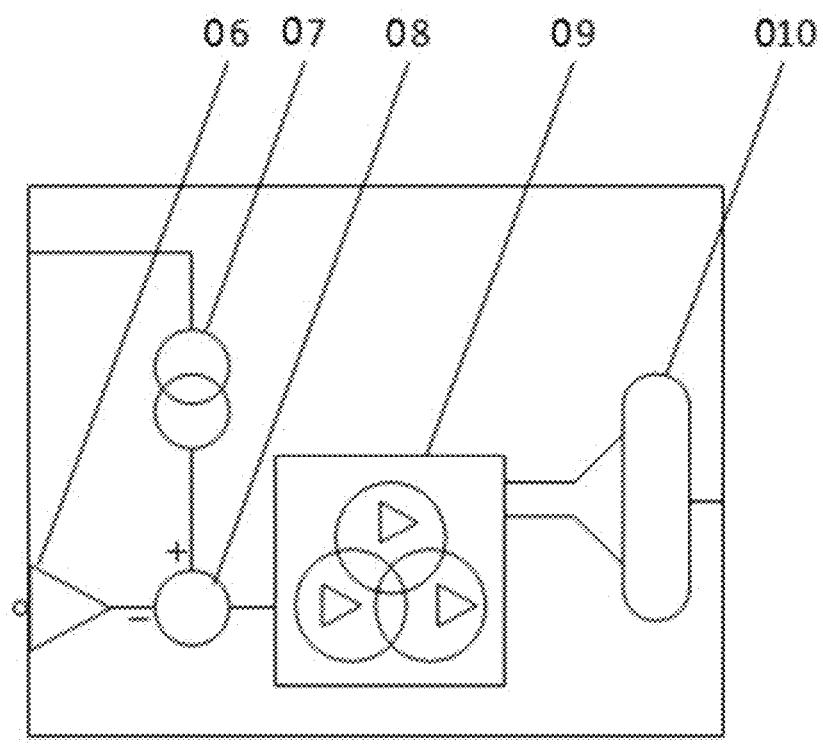
FIG. 7 is a schematic diagram of the fundamental wave module shown in FIG. 5.

As shown in FIGS. 6 and 7, the fundamental wave unit 02 comprises a plurality of fundamental wave modules arranged in parallel, and the fundamental wave module comprises a driver 06, a BAW filter 07, a charge pump 08, an electro-photon transition module 09 and a resonant cavity 010, wherein the logic unit 01 controls the opening and closing of the charge pump 08 through the driver 06, an external power supply supplies power to the electro-photon transition module 09 through the BAW filter 07 and the charge pump 08, and the electron beam generated in the electric-photon transition module 09 is transmitted to the resonant cavity 010 to generate a stable terahertz fundamental wave, wherein the logic unit 01 controls each fundamental wave module to transmit terahertz fundamental wave, which is transmitted to the equalization circuit 03, wherein the equalization circuit 03 modulates the received terahertz fundamental wave to obtain a composite terahertz wave, wherein the composite terahertz wave is transmitted to the amplifier 04, and the amplifier 04 amplifies the received composite terahertz wave to obtain an amplified terahertz wave, wherein the amplified terahertz wave is transmitted to the radiator 05.

Figure 8:
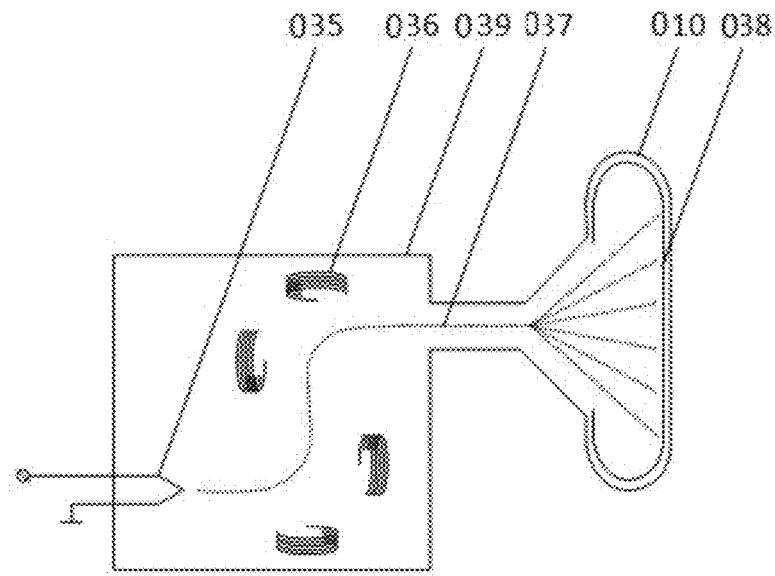
FIG. 8 is a schematic diagram of the electro photonic transition module shown in FIG. 7.
Figure 9:
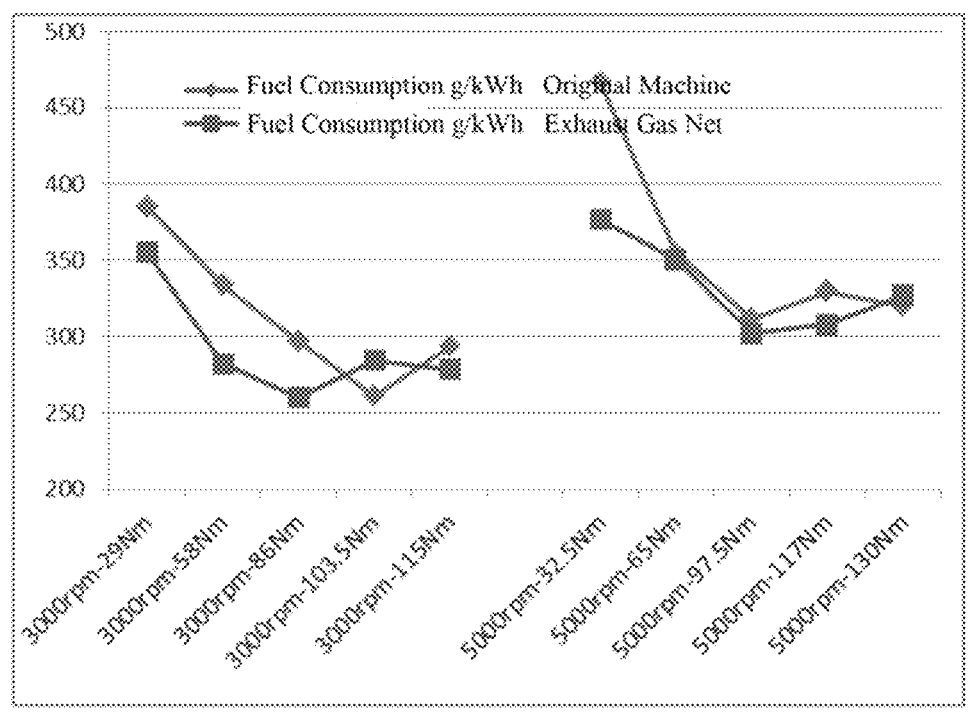
FIG. 9 is a comparison diagram of energy saving effect of the terahertz material used for emission reduction and fuel saving of a gasoline vehicle.
Figure 10:
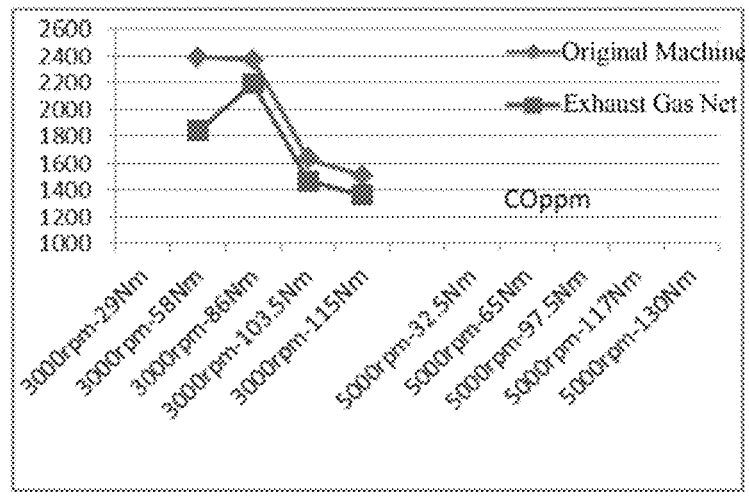
FIG. 10 is a comparison diagram of the carbon monoxide emission reduction effect of the terahertz material used for emission reduction and fuel saving of a gasoline vehicle.
Figure 11:
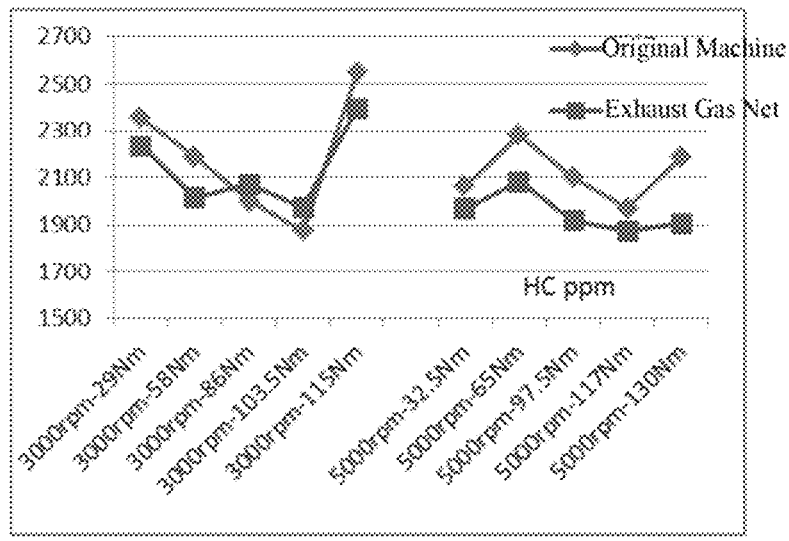
FIG. 11 is a comparison diagram of the hydrocarbon's emission reduction effect of the terahertz materials for a gasoline vehicle emission reduction and fuel saving.
Figure 12:
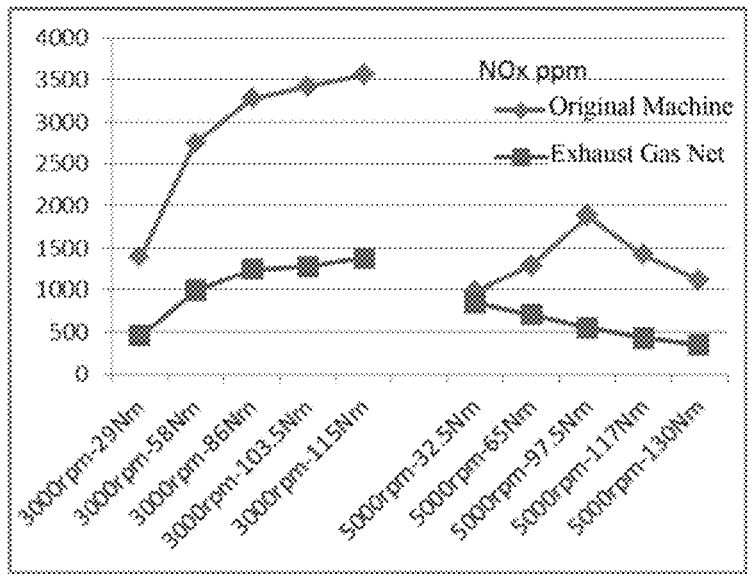
FIG. 12 is a comparison diagram of the $NO_x$ emission reduction effect of the terahertz materials used for a gasoline vehicle emission reduction and fuel saving.

As shown in FIG. 8, the electro-photon transition module 09 comprises an electron gun 035, a pulse deflection coil 036, an electron beam 037, an anode 038 and a transition cavity 039, wherein the transition cavity 039 is communicated with the resonant cavity 010, the electron gun 035 and the pulse deflection coil 036 are installed within the transition cavity 039, and a frequency selective electric field is formed between the pulse deflection coil 036, wherein the anode 038 is installed on the inner wall of the resonant cavity 010, the electron gun 035 is communicated with the external power supply through the charge pump 08 and the BAW filter 07, wherein the electron gun 035 emits an electron beam into the frequency selected electric field constructed by the pulse deflection coil 036, wherein the frequency selected electron beam enters the resonant cavity 010 and is received by the anode 038 to generate the terahertz fundamental wave.

Example 2 a terahertz material for emission reduction and fuel saving of a gasoline vehicle including the following raw materials in parts by weight: 20 $SiO_x$, 15 $Al_2O_3$, 25 $SiO_2$, 25 $Fe_2O_3$, 20 ochre, 2 barium tungstate, 15 $CaCO_3$.

The preparation method of the terahertz material for emission reduction and fuel saving of a gasoline vehicle, comprising the following steps:

(1) mixing crude silicon, $SiO_2$ and Binchotan in a weight ratio of 1:3:5, and heating to 700° C. in an oxygen-free environment for 8 hours to obtain a black crystal $SiO_x$; and then mixing the prepared $SiO_x$ with other raw materials in accordance with the stated proportions, crushing, the fineness reaches 200~500 mesh, and adding an appropriate amount of water, stirring, turning it into small balls through a circular rotary table, heating to 1000° C. in an oxygen free environment for 5 hours, and carrying out a secondary crushing; and then detecting its infrared emissivity, which is ≥0.92, and then crushing and powder processing, the fineness reaches is more than 10000 mesh, after being enhanced by a terahertz irradiation line (50 W power, the time of duration: 1 min) to obtain a terahertz materials for emission reduction and fuel saving of a gasoline vehicle.

The structure of the terahertz irradiation source is the same as that in example 1.

Example 3 a terahertz material for emission reduction and fuel saving of a gasoline vehicle including the following raw materials in parts by weight: 35 $SiO_x$, 3 $Al_2O_3$, 45 $SiO_2$, 5 $Fe_2O_3$, 40 ochre, 0.5 barium tungstate, 25 $CaCO_3$.

The preparation method of the terahertz material for emission reduction and fuel saving of a gasoline vehicle, comprising the following steps:

(1) mixing crude silicon, $SiO_2$ and Binchotan in a weight ratio of 1:5:10, and heating to 1500° C. in an oxygen-free environment for 1 hour to obtain a black crystal $SiO_x$;

(2) mixing the prepared $SiO_x$ with other raw materials in accordance with the stated proportions, crushing, the fineness reaches 200~500 mesh, and adding an appropriate amount of water, stirring, turning it into small balls through a circular rotary table, heating to 600° C. in an oxygen free environment for 8 hours, and carrying out a secondary crushing;

(3) detecting its infrared emissivity, which is ≥0.92, and then crushing and powder processing, the fineness reaches is more than 10000 mesh, after being enhanced by a terahertz irradiation line (100 W power, the time of duration: 5 sec) to obtain a terahertz materials for emission reduction and fuel saving of a gasoline vehicle.

The structure of the terahertz irradiation source is the same as that in example 1.

Example 4 a terahertz material for emission reduction and fuel saving of a gasoline vehicle including the following raw materials in parts by weight: 25 $SiO_x$, 10 $Al_2O_3$, 10 $SiO_2$, 40 $Fe_2O_3$, 18 ochre, 1.5 barium tungstate, 22 $CaCO_3$.

The preparation method of the terahertz material for emission reduction and fuel saving of a gasoline vehicle, comprising the following steps:

(1) mixing crude silicon, $SiO_2$ and Binchotan in a weight ratio of 1:4:7, and heating to 1000° C. in an oxygen-free environment for 5 hours to obtain a black crystal $SiO_x$;

(2) mixing the prepared $SiO_x$ with other raw materials in accordance with the stated proportions, crushing, the fineness reaches 200~500 mesh, and adding an appropriate amount of water, stirring, turning it into small balls through a circular rotary table, heating to 1200° C. in an oxygen free environment for 3 hours, and carrying out a secondary crushing;

(3) detecting its infrared emissivity, which is ≥0.92, and then crushing and powder processing, the fineness reaches is more than 10000 mesh, after being enhanced by a terahertz irradiation line (10 mW power, the time of duration: 1 hour) to obtain a terahertz materials for emission reduction and fuel saving of a gasoline vehicle.

The structure of the terahertz irradiation source is the same as that in example 1.

Exemplary Application 1

FIG. 1 shows an engine 1, which is also the most basic application form of the present invention. The terahertz material for emission reduction and fuel saving of the present invention is used and added a terahertz coolant 3 and a terahertz air filter housing 16 and use them in combination.

Main performance: Hydrocarbon HC is reduced by 35~99%, nitrogen oxide $NO_x$ is reduced by 40~90%, carbon monoxide CO is reduced by 30~~5%, urban energy saving is 6-10%, high-speed energy saving is 9-20% (limit 40%), 0-100 km/h travel distance is shortened by 10%, 0-100 km/h acceleration time is reduced by 3%, power curve is obviously improved, the first-gear fuel label is lowered and fuel economy is more efficient.

The terahertz material of the present invention is made into the engine coolant 3 having functions of emission reduction, energy saving and power enhancement, which is injected into the cooling system through the main water tank port 4. Some engine systems do not have a main water tank port, it can be injected into the engine system from the auxiliary water tank 5.

The application of the terahertz material of the present invention in gasoline engines includes the following features:

1) The performance of the antifreeze of the terahertz coolant is the same as that of the ordinary antifreeze, and the specifications are the same as that of the ordinary antifreeze.
2) The service life of the terahertz coolant is the same as that of ordinary antifreeze, and its performance as a coolant during this period is not attenuated. As long as the system does not leak, or the loss of coolant caused by a vehicle accident, its emission reduction and energy saving performance will not change.
3) The terahertz coolant is safe for people without nuclear radiation (particle radiation).
4) When the air filter housing is made, the terahertz material is mixed with the plastic master batch for injection molding. Do not mix into the metal casing. The filter having a metal casing can only use the terahertz activation sheet 11 (shown in FIG. 2) to achieve the emission reduction, energy saving and power improvement effect of the present invention.
5) The air filter housing with the terahertz material added, as an air filter housing, has the same strength and temperature resistance as the ordinary air filter housings. The terahertz materials have no effect on the durability of plastics, reducing emissions and the durability of energy saving and improving power performance is more than 20 years.

This scheme is very suitable for automobile and engine production plants to directly adopt during vehicle production.

Exemplary Application 2

Figure 2:
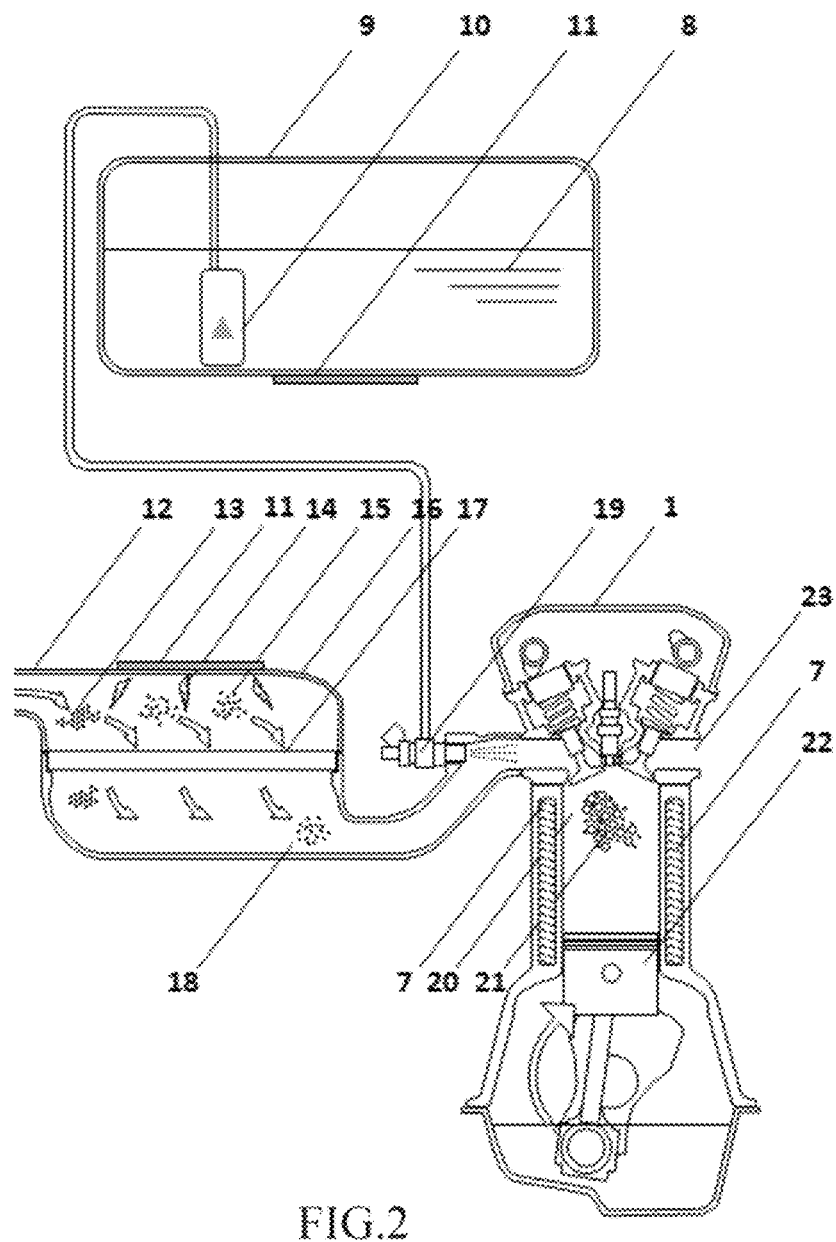
FIG. 2 shows a preferred modified scheme of the terahertz material for emission reduction and fuel saving of a gasoline vehicle of the present invention.

As shown in FIG. 2, the terahertz material for emission reduction and fuel saving of the present invention can be used for manufacturing a variety of emission reduction and energy saving products based on the terahertz principle, including the antifreeze essence 24, the air activation tablets 25-26, and the fuel activation tablets 27-28, and so on. The most classic application method of this solution is the same as that of Example 1. The antifreeze essence 24 and the air activation sheet 25 has the same effect as that of Example 1. This scheme is more suitable used for retrofitting existing vehicles.

The antifreeze essence 24 is injected into the cooling system through the main water tank port. Some engine systems do not have a main water tank port, it can be injected into the engine system from the auxiliary water tank. It is extremely easy to stick the air activation sheet on the outside 25 of the air filter housing. However, in some vehicles, there is no flat surface on the air filter housing for sticking the air activating sheet, and sticking the air activating sheet on the outside of the engine intake pipe 26 can achieve almost the same effect. The implement difficulty of the fuel activation sheet is much greater than that of the air activation sheet, and the efficiency improvement is not obvious, so it is not necessary to use it.

1) After the antifreeze essence is added into the cooling system, its cooling and antifreeze performance is the same as that of ordinary antifreeze, and its emission reduction and energy saving performance is the same as that of the terahertz coolant.
2) After the antifreeze essence is added into the cooling system, the service life of the terahertz coolant is the same as that of ordinary antifreeze, and its performance as a coolant during this period is not attenuated. As long as the system does not leak, or the loss of coolant caused by a vehicle accident, its emission reduction and energy saving performance will not change.
3) The antifreeze essence and the air-activated sheet are safe for people without nuclear radiation (particle radiation).
4) The service life of the air activated sheet is 10 years, and its temperature resistance range is −40~200° C., which is fully adapted to the harsh environment in the engine compartment.

This scheme is very suitable for the emission reduction and energy saving modification of existing vehicles, which will surely bring considerable benefits to the society and car owners.

Exemplary Application 3

Figure 3:
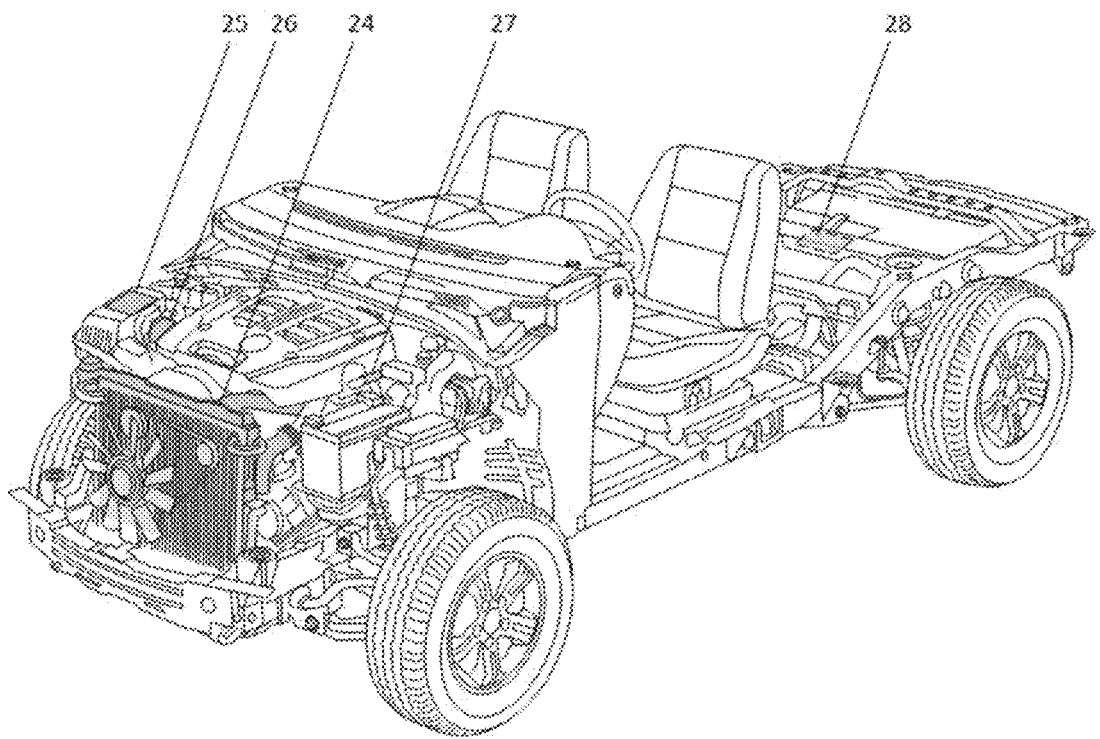
FIG. 3 shows all schemes of automobile transformation with the terahertz material for emission reduction and fuel saving of a gasoline vehicle of the present invention.
Figure 4:
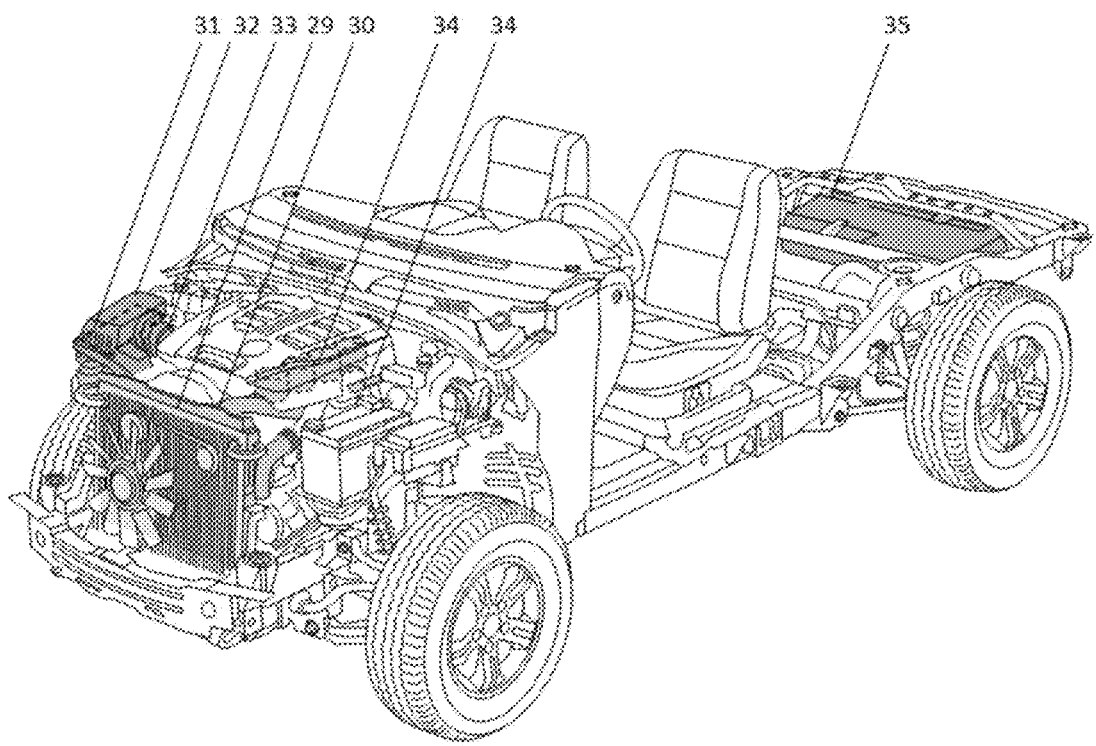
FIG. 4 shows an application of the terahertz material for emission reduction and fuel saving of a gasoline vehicle of the present invention in a system maker.

As shown in FIG. 3, it is enumerated that the use of the terahertz material for emission reduction and fuel saving of the present invention can produce a variety of emission reduction and energy saving original vehicle parts based on the terahertz principle. Such a scheme needs to be further verified and optimized by the whole machine factory and engine factory. It includes a special coolant 29 containing terahertz material, a main water tank 30, an air filter element 31, an air filter housing 32, an engine intake pipe 33, a fuel pipe 34, a fuel tank bottom 35, a ceramic piston, a spark plug, and a cylinder liner 36.

The terahertz material for emission reduction and fuel saving of the present invention can only be added to materials that are formed at medium and low temperature (<500° C.) such as ceramics, plastics, silica gel, and rubber. For parts made of metal, composite materials can be used, a layer of organic material is attached to the metal, and the organic material is added with the method of reducing emission and fuel saving terahertz material of the present invention.

The life and strength of all parts in this solution are exactly the same as those of the original parts, and the specifications and dimensions are also exactly the same. It is only necessary to pay attention not to use the original parts when repairing and replacing, otherwise the emission reduction and energy saving effect will be greatly reduced.

Engine Bench Test (Exhaust Gas Net: Coolant Additive and Air Activation Paste)

Full diesel gasoline engine model: A15G; Fuel: 92 gasoline (including alcohol); Cylinder arrangement In line four cylinders; Test time: Jan. 16, 2019; Power: 84 kw; Torque: 143 nm; displacement 1.499 L; Test location: Luoyang, Henan; New energy engine laboratory, Henan University of science and technology. The test results are shown in table 1-4 and FIGS. 8-12.

TABLE 1

Energy saving effect of exhaust gas net:

| | | | Fuel Consumption g/kWh | |
| --- | --- | --- | --- | --- |
| Revolution/ rpm | Torque/ Nm | Working Condition | Original Machine | Exhaust Gas Net |
| 3000 | 29 | 3000 rpm-29 Nm | 385.3 | 355.3 |
| | 58 | 3000 rpm-58 Nm | 333.8 | 282.1 |
| | 86 | 3000 rpm-86 Nm | 297.4 | 259.9 |
| | 103.5 | 3000 rpm-103.5 Nm | 260.6 | 284.2 |
| | 115 | 3000 rpm-115 Nm | 293.4 | 278.3 |
| 5000 | 32.5 | 5000 rpm-32.5 Nm | 466.5 | 376.7 |
| | 65 | 5000 rpm-65 Nm | 354.4 | 350.1 |
| | 97.5 | 5000 rpm-97.5 Nm | 312.1 | 302.2 |
| | 117 | 5000 rpm-117 Nm | 329.7 | 308 |
| | 130 | 5000 rpm-130 Nm | 320.3 | 326.9 |

TABLE 2

Emission reduction effect of exhaust gas net-carbon monoxide:

| | | CO ppm | | |
| --- | --- | --- | --- | --- |
| Torque/Nm | Revolution-Torque | Original Machine | Exhaust Gas Net | Suppression Ratio |
| 29 | 3000 rpm-29 Nm | | | |
| 58 | 3000 rpm-58 Nm | 2393 | 1837 | 23.2% |
| 86 | 3000 rpm-86 Nm | 2374 | 2192 | 7.7% |
| 103.5 | 3000 rpm-103.5 Nm | 1635 | 1471 | 10.0% |
| 115 | 3000 rpm-115 Nm | 1510 | 1365 | 9.6% |
| 32.5 | 5000 rpm-32.5 Nm | over | over | |
| 65 | 5000 rpm-65 Nm | over | over | |
| 97.5 | 5000 rpm-97.5 Nm | over | over | |
| 117 | 5000 rpm-117 Nm | over | over | |
| 130 | 5000 rpm-130 Nm | over | over | |

TABLE 3

Emission reduction effect of exhaust gas net- hydrocarbon:

| | | HC ppm | | |
| --- | --- | --- | --- | --- |
| Torque/ Nm | Revolution-Torque | Original Machine | Exhaust Gas Net | Suppression Ratio |
| 29 | 3000 rpm-29 Nm | 2355 | 2236 | 5.1% |
| 58 | 3000 rpm-58 Nm | 2187 | 2014 | 7.9% |
| 86 | 3000 rpm-86 Nm | 2000 | 2070 | −3.5% |
| 103.5 | 3000 rpm-103.5 Nm | 1875 | 1972 | −5.2% |
| 115 | 3000 rpm-115 Nm | 2548 | 2396 | 6.0% |
| 32.5 | 5000 rpm-32.5 Nm | 2061 | 1967 | 4.6% |
| 65 | 5000 rpm-65 Nm | 2280 | 2081 | 8.7% |
| 97.5 | 5000 rpm-97.5 Nm | 2100 | 1918 | 8.7% |
| 117 | 5000 rpm-117 Nm | 1968 | 1872 | 4.9% |
| 130 | 5000 rpm-130 Nm | 2185 | 1905 | 12.8% |

TABLE 4

Emission reduction effect of exhaust gas net-nitrogen oxide:

| | | NO$_x$ ppm | | |
| --- | --- | --- | --- | --- |
| Torque/Nm | Revolution-Torque | Original Machine | Exhaust Gas Net | Suppression Ratio |
| 29 | 3000 rpm-29 Nm | 1388 | 450.7 | 67.5% |
| 58 | 3000 rpm-58 Nm | 2748 | 987 | 64.1% |
| 86 | 3000 rpm-86 Nm | 3281 | 1243 | 62.1% |
| 103.5 | 3000 rpm-103.5 Nm | 3421 | 1279 | 62.6% |
| 115 | 3000 rpm-115 Nm | 3559 | 1383 | 61.1% |
| 32.5 | 5000 rpm-32.5 Nm | 975 | 850.3 | 12.8% |
| 65 | 5000 rpm-65 Nm | 1290 | 708.6 | 45.1% |
| 97.5 | 5000 rpm-97.5 Nm | 1881 | 552.9 | 70.6% |
| 117 | 5000 rpm-117 Nm | 1418 | 431.8 | 69.5% |
| 130 | 5000 rpm-130 Nm | 1114 | 347.3 | 68.8% |

The basic principles and main features of the invention and the advantages of the invention are shown and described above. Those skilled in the art should understand that the invention is not limited by the above embodiments. What is described in the above embodiments and specifications is only to explain the principle of the invention. On the premise of not departing from the spirit and scope of the invention, the invention will have various changes and improvements, which fall within the scope of the claimed invention. The scope of protection claimed by the present invention is defined by the appended claims and their equivalents.

What is claimed is:

1. A preparation method for a terahertz material, comprising the following steps:
   (1) mixing crude silicon, SiO$_2$ and Binchotan in a weight ratio of 1:(3-5):(5-10), and heating to 700-1500° C. in an oxygen-free environment for 1-8 hours to obtain a silicon-containing oxide black crystal;
   (2) mixing the prepared silicon-containing oxide black crystal with other raw materials in parts by weight: 3-15 Al$_2$O$_3$, 25-45 SiO$_2$, 15-25 Fe$_2$O$_3$, 20-40 ochre, 0.5-2 barium tungstate, 15-25 CaCO$_3$, crushing to obtain a mixture, wherein the fineness of the mixture reaches 200-500 mesh, and then adding an appropriate amount of water, stirring and turning into small balls, heating to 600-1200° C. in an oxygen free environment for 3-8 hours, and carrying out a secondary crushing;
   (3) detecting a raw terahertz material, if the raw terahertz material has an infrared emissivity which is ≥0.92, and then crushing and powdering the raw terahertz material to make the fineness of the crushed and powdered raw terahertz material more than 10000 mesh, and then enhancing the crushed and powdered raw terahertz material by a terahertz irradiation line to obtain a terahertz material for emission reduction and fuel saving of gasoline vehicle.

2. The preparation method for a terahertz material, as recited in claim 1, the other raw materials including the following materials in parts by weight: 25 silicon-containing oxide black crystal, 8 Al$_2$O$_3$, 30 SiO$_2$, 20 Fe$_2$O$_3$, 30 ochre, 1 barium tungstate, 20 CaCO$_3$, wherein the silicon-containing oxide black crystal is made by mixing crude silicon, SiO$_2$ and Binchotan in a weight ratio of 1:4:8, and heating to 1200° C. in an oxygen-free environment for 5 hours.

3. The preparation method for a terahertz material, as recited in claim 1, the other raw materials including the following materials in parts by weight: 20 silicon-containing oxide black crystal, 15 Al$_2$O$_3$, 25 SiO$_2$, 25 Fe$_2$O$_3$, 20 ochre, 2 barium tungstate, 15 CaCO$_3$, wherein the silicon-containing oxide black crystal is made by mixing crude silicon, SiO$_2$ and Binchotan in a weight ratio of 1:3:5, and heating to 700° C. in an oxygen-free environment for 8 hours.

4. A preparation method for a terahertz material, comprising the following steps:
   (1) mixing crude silicon, SiO$_2$ and Binchotan in a weight ratio of 1:(3-5):(5-10), and heating to 700-1500° C. in an oxygen-free environment for 1-8 hours to obtain a silicon-containing oxide black crystal;
   (2) mixing the prepared silicon-containing oxide black crystal with other raw materials in parts by weight: 35 silicon-containing oxide black crystal, 3 Al$_2$O$_3$, 45 SiO$_2$, 5 Fe$_2$O$_3$, 40 ochre, 0.5 barium tungstate, 25 CaCO$_3$, wherein the silicon-containing oxide black crystal is made by mixing crude silicon, SiO$_2$ and Binchotan in a weight ratio of 1:5:10, and heating to 1500° C. in an oxygen-free environment for 1 hour; crushing to obtain a mixture, wherein the fineness of the mixture reaches 200-500 mesh, and then adding an appropriate amount of water, stirring and turning into small balls, heating to 600-1200° C. in an oxygen free environment for 3-8 hours, and carrying out a secondary crushing;
   (3) detecting a raw terahertz material, if the raw terahertz material has an infrared emissivity which is ≥0.92, and then crushing and powdering the raw terahertz material to make the fineness of the crushed and powdered raw terahertz material more than 10000 mesh, and then enhancing the crushed and powdered raw terahertz material by a terahertz irradiation line to obtain a terahertz material for emission reduction and fuel saving of gasoline vehicle.

5. A preparation method for a terahertz material, the comprising the following steps:
   (1) mixing crude silicon, SiO$_2$ and Binchotan in a weight ratio of 1:(3-5):(5-10), and heating to 700-1500° C. in an oxygen-free environment for 1-8 hours to obtain a silicon-containing oxide black crystal;
   (2) mixing the prepared silicon-containing oxide black crystal with other raw materials in parts by weight: 25 silicon-containing oxide black crystal, 10 Al$_2$O$_3$, 10 SiO$_2$, 40 Fe$_2$O$_3$, 18 ochre, 1.5 barium tungstate, 22 CaCO$_3$, wherein the silicon-containing oxide black crystal is made by mixing crude silicon, SiO$_2$ and Binchotan in a weight ratio of 1:4:7, and heating to 1000° C. in an oxygen-free environment for 5 hours; crushing to obtain a mixture, wherein the fineness of the mixture reaches 200-500 mesh, and then adding an appropriate amount of water, stirring and turning into small balls, heating to 600-1200° C. in an oxygen free environment for 3-8 hours, and carrying out a secondary crushing;
   (3) detecting a raw terahertz material, if the raw terahertz material has an infrared emissivity which is ≥0.92, and then crushing and powdering the raw terahertz material to make the fineness of the crushed and powdered raw terahertz material more than 10000 mesh, and then enhancing the crushed and powdered raw terahertz material by a terahertz irradiation line to obtain a terahertz material for emission reduction and fuel saving of gasoline vehicle.

* * * * *